Oct. 23, 1951      E. R. PRICE      2,572,660
POWER PLANT MECHANISM

Original Filed Sept. 9, 1946      2 SHEETS—SHEET 1

INVENTOR.
EARL R. PRICE.
BY
ATTORNEY

Oct. 23, 1951     E. R. PRICE     2,572,660
POWER PLANT MECHANISM
Original Filed Sept. 9, 1946     2 SHEETS—SHEET 2
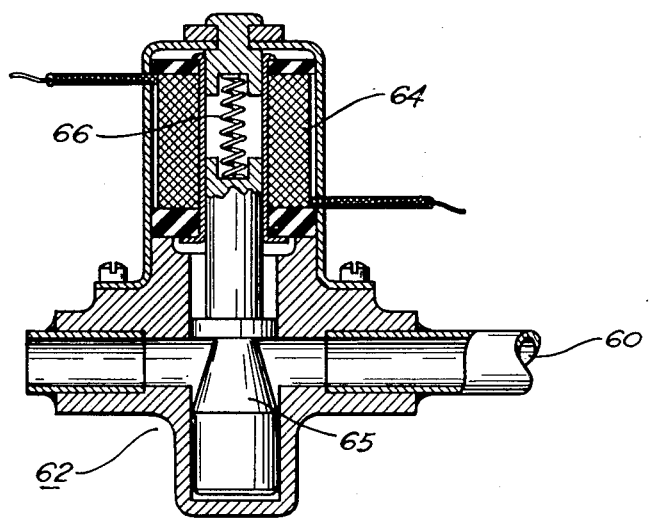
Fig. 4.
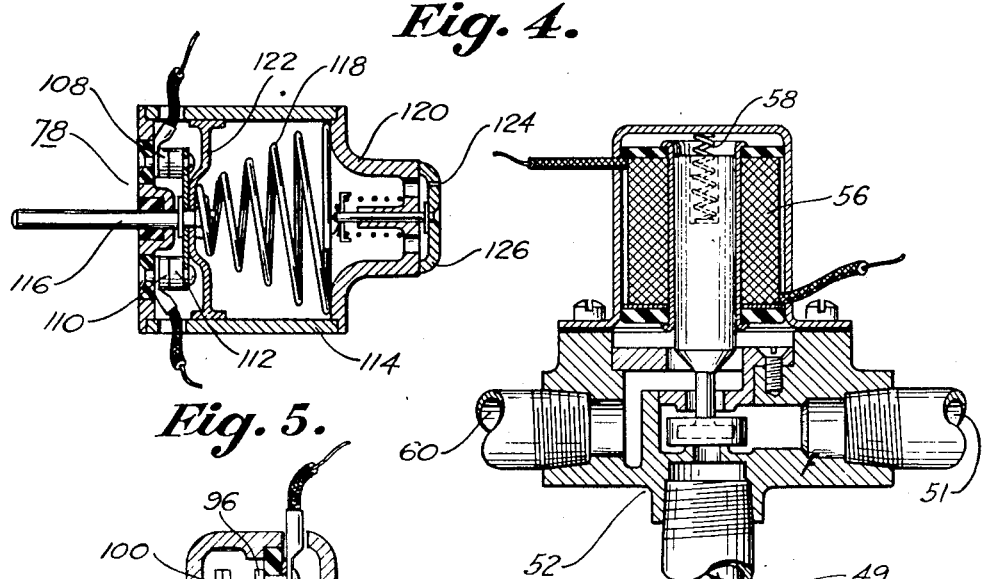
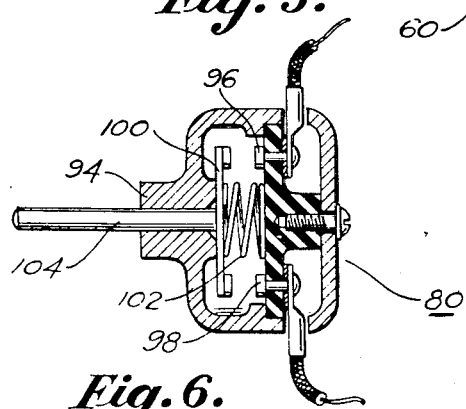
Fig. 5.
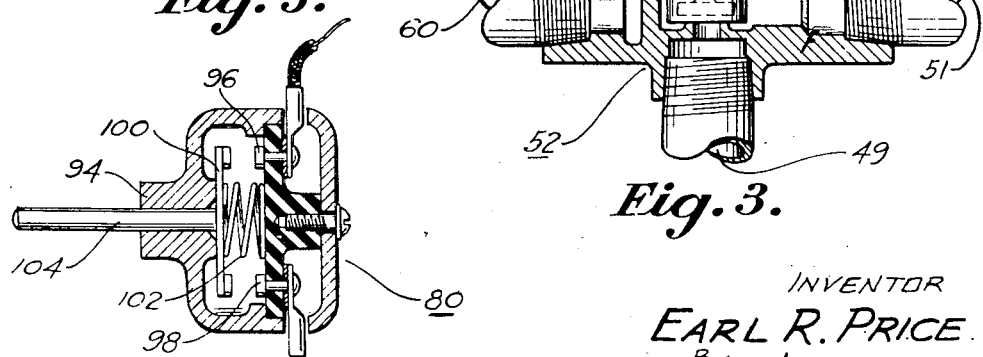
Fig. 3.
Fig. 6.
INVENTOR
EARL R. PRICE.
BY H. O. Clayton
ATTORNEY

Patented Oct. 23, 1951

2,572,660

UNITED STATES PATENT OFFICE 2,572,660

POWER PLANT MECHANISM

Earl R. Price, South Bend, Ind., assignor to Bendix Aviation Corporation, South Bend, Ind., a corporation of Delaware Original application September 9, 1946, Serial No. 697,877. Divided and this application August 27, 1948, Serial No. 46,511

7 Claims. (Cl. 192—.07)

This invention relates in general to power and manually operated means for controlling the operation of the friction clutch and the throttle of an automotive vehicle and in particular to means for effecting the desired synchronization of said controls in the operation of the power plant of said vehicle.

Yet another object of my invention is to provide, in the power plant of an automotive vehicle, means for interconnecting the accelerator, the clutch, the throttle and clutch operating motor, said means serving to hold the throttle closed as the motor is operative to disengage the clutch and also serving to insure a synchronized engagement of the clutch and opening of the throttle after the motor is de-energized to permit a re-engagement of the clutch.

A further object of my invention is to provide a stage type of power means for operating the friction clutch of an automotive vehicle, said means serving to control the operation of the throttle of said vehicle by insuring a closing of the throttle as the clutch is being disengaged and also serving to effect a synchronized engagement of the clutch and opening of the throttle as the clutch is being engaged.

Yet another object of my invention is to provide, in the power plant of an automotive vehicle, a stage type of power means for operating the friction clutch of said power plant, said power means also serving to so control the opening of the engine throttle of said power plant that said opening effects, in cooperation with the engagement of the clutch, the desired acceleration of the vehicle.

Yet another object of my invention is to provide, in the power plant of an automotive vehicle including an engine throttle and a clutch, means, including a single acting pressure differential motor, for operating the throttle and clutch, said means also including a two part stop means which serves to maintain the throttle closed as the clutch is being disengaged and to effect a controlled opening of the throttle as the clutch is being engaged.

Other objects of the invention and desirable details of construction and combination of parts will become apparent from the following descriptions of preferred embodiments of my invention, which descriptions are taken in conjunction with the accompanying drawings, in which:

Figure 3 is a sectional view of the solenoid operated three way valve unit constituting one of the controls for the pressure differential operated motor disclosed in Figure 1;

Figure 4 is a sectional view of the solenoid operated choke valve constituting another control for the pressure differential operated motor disclosed in Figure 1;

Figure 5 is a sectional view disclosing details of one of the three motor piston operated breaker switches of the mechanism of Figure 1 of my invention; and Figure 6 is a sectional view disclosing details of another of the motor piston operated breaker switches of the mechanism of Figure 1 of my invention.

Figure 1:
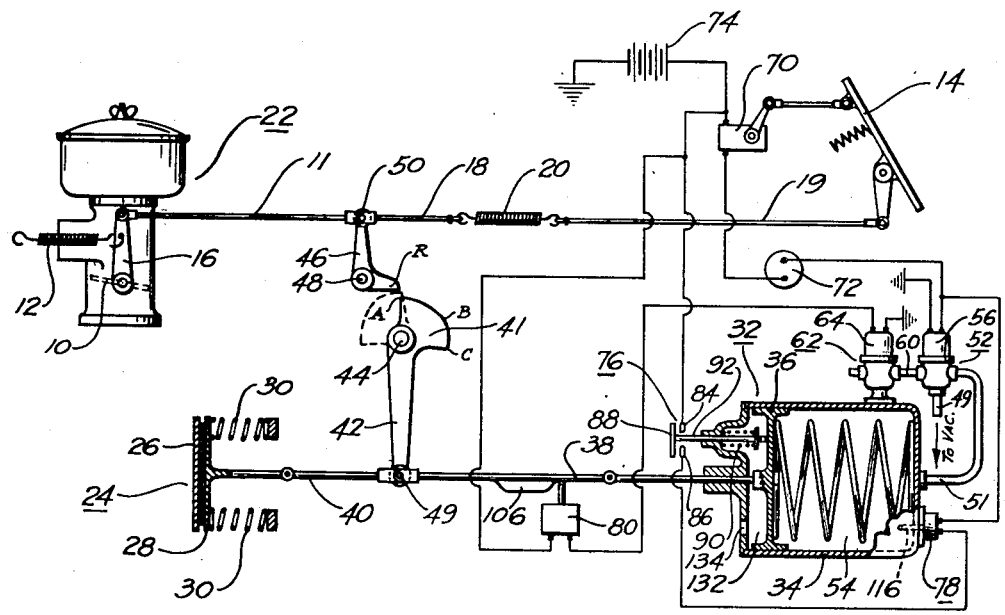
Figure 1 is a diagrammatic view disclosing the principal features of one embodiment of the clutch and throttle operating means constituting my invention.

Referring now to Figure 1, disclosing one embodiment of my invention, a throttle valve 10, which is rotated to its closed position by a spring 12, is operatively connected to the accelerator 14 of an automotive vehicle by means of force transmitting means including a crank 16, a link 18, a link 11, a link 19 connected to the accelerator, and a spring 20 the latter interconnecting the links 18 and 19. The throttle valve 10 constitutes a part of a standard type of automotive carburetor 22.

My invention includes a friction clutch operating means operable to control the operation of the aforementioned throttle operating force transmitting means. The friction clutch 24 to be operated is diagrammatically disclosed in Figure 1 and includes a driving plate 26 and a driven plate 28 said plates being forced into driving contact with each other by spring means 30; and said clutch is disengaged by a pressure differential operated motor 32 including a cylinder 34 and a piston 36 the latter being connected to the driven clutch plate 28 by means of links 38 and 40.

One of the most important features of my invention lies in the connection between the motor piston 36 and the aforementioned throttle operating force transmitting linkage; and said connection, constituting a throttle controlling stop means, preferably includes a bell crank lever 42, pivotally mounted upon a fixed pivot 44, and a bell crank lever 46 pivotally mounted upon a fixed pivot 48. The lower arm of the lever 42 is pivotally connected at 49 to ends of the links 38 and 40 and the upper arm of lever 46 is pivotally connected at 50 to the links 18 and 11. One of the principal features of this two part stop means lies in the outline of the upper arm 41 of the lever 42; for said upper arm is shaped to provide means operative as a cam to control the mode of opening of the throttle during the engagement of the clutch; and said arm is also shaped and so cooperates with the throttle operating linkage and the lever 46 connected thereto, as to prevent an opening of the throttle as the clutch is being disengaged.

Describing the means for controlling the operation of the motor 32 said means includes a three way valve 52, Figures 1 and 3, operative to connect a control compartment 54 of said motor either with a source of vacuum, preferably the intake manifold of the engine of the vehicle, or with the atmosphere. The valve 52 is actuated to energize the motor 32 by means of a solenoid 56 and said valve is actuated to de-energize said motor by means of a spring 58. When the solenoid 56 is energized the valve 52 is operated to interconnect the intake manifold of the engine with the compartment 54 via conduits 49 and 51 thereby effecting the energization of the motor; and when the solenoid is de-energized the spring 58 functions to operate said valve to vent said compartment to the atmosphere via a conduit 60 and the conduit 51 thereby effecting a de-energization of the motor. As is disclosed in Figure 4 the air flowing into the conduit 60 is controlled by a so-called choke valve 62 said valve being actuated, when a grounded solenoid 64 is energized, to move a cone-shaped portion 65 of the valve upwardly to reduce the cross-sectional area of the vent passage connected with the conduit 60; and said cone-shaped portion 65 is actuated by a spring 66, when the solenoid 64 is de-energized, to increase the cross-sectional area of said passage. When the latter operation is effected the flow of air into the compartment 54 is unrestricted.

Describing now the electrical means for controlling the operation of the solenoids 56 and 64 the solenoid 56, which is grounded, is in part preferably controlled by an accelerator operated breaker switch 70 and a vehicle speed responsive governor operated breaker switch 72 said solenoid and switches being electrically connected in series with a grounded battery 74; and as is disclosed in Figure 1 the operation of the solenoid 56 is also controlled by switches 76 and 78 which are operated by the piston 36 of the motor 32 said switches being electrically connected in series in an electrical circuit which is in parallel with the aforementoned accelerator operated switch 70 and governor operated switch 72. As to the electrical means for controlling the choke valve operating solenoid 64 this control means is controlled by a piston operated breaker switch 80 disclosed in detail in Figure 6. The piston operated switch 76 which is diagrammatically disclosed in detail in Figure 1 includes a casing, not shown, mounted on the cylnder 34 said casing housing fixed switch contacts 84 and 86 and a movable switch contact 88 biased into engagement with the fixed contacts by a spring 90. The movable contact includes a pin 92 slidably through the end wall of the cylinder said pin being contacted by the piston 36 to open the switch when said piston reaches its clutch disengaged position, that is its position in the left end of the cylinder 34.

Describing the piston operated breaker switch 80 disclosed in detail in Figure 6, this switch includes a casing 94 housing fixed contacts 96 and 98 and a movable contact 100 biased to its switch off position by a spring 102. To the movable contact 100 there is secured a pin 104 contacted by a cam member 106, Figure 1, secured to the rod 38.

The piston operated breaker switch 78 includes fixed contacts 108 and 110 and a movable contact 112 said contacts being suitably housed within a casing 114 conveniently mounted upon the cylinder 34. To the movable contact 112 there is secured a stem 116 which is slidably mounted in an end wall of the cylinder 34; and a spring 118 interposed between the inner face of one of the ends of the casing 114 and a guide member 122 secured to the end of the stem 116, serves to bias the movable contact member 112 into engagement with the fixed contact members 108 and 110 to close the switch.

The governor operated breaker switch 72 and the accelerator operated breaker switch 70 are of standard construction accordingly the same are not disclosed in detail.

Describing now the complete operation of the above described mechanism it will be assumed that the car is at a standstill with the accelerator released and the engine dead. This being the case the pressure differential operated motor 32 will be de-energized and the piston 36 and other parts of the previously described mechanism will take positions disclosed in Figure 1. If the engine is now cranked, the accelerator remaining released to keep the throttle closed, there will be developed, by virtue of the pumping operation of the engine pistons, a partial evacuation of the intake manifold of said engine; and this evacuated condition of the manifold will result in an energization of the motor 32 to move the piston 36 to the right end of the cylinder, Figure 1, thereby effecting a disengagement of the clutch. The valve 52 is at this time open to make this operation of the motor possible inasmuch as the accelerator and governor operated switches 70 and 72 are at this time closed to effect an energization of the solenoid 56. The governor operated switch is preferably closed at a relatively low car speed say, 8 M. P. H.

Explaining in greater detail this clutch disengaging operation of the piston 36 the piston is, by virtue of admission of air to a compartment 132 of the motor via an opening 134 and by virtue of the above described partial evacuation of the compartment 54, subjected to a differential of pressures to move the same to the right, Figure 1; and this movement of the piston results in a rotation of the lever 42 to move the cam portion 41 of said lever to the position shown in dotted lines in Figure 1.

The driver will then probably place the transmission in its low gear setting whereupon he will depress the accelerator to open the throttle 10 and the switch 70. The throttle, however, will remain in its closed, that is throttle idle position, during the aforementioned movement of the piston 36 to disengage the clutch; for the toe end portion CB of the cam 41 will then act as a stop to prevent a clockwise rotation of the lever 46 or its equivalent stop means. It is apparent, therefore, that if the accelerator is depressed as the piston 36 is moving to disengage the clutch that the spring 20 will be expanded. Maintaining the throttle at its idle setting during the clutch disengaging operation of the motor 32 serves to insure sufficient vacuum to effect said operation; for if the throttle were opened during this operation such action would substantially lower the vacuum of the intake manifold thereby making it impossible to complete the clutch disengaging operation of said motor.

In this clutch disengaging operation of the motor 32 the switches 76 and 78 are closed, however, when the piston 36 reaches the end of its stroke it opens the switch 78 and with the accelerator at the time depressed to open the switch 70, this opening of the switch 78 results in a deenergization of the motor 32 to initiate its clutch engaging operation. In this operation the piston 36 moves to the left, Figure 1, to effect a clockwise rotation of the lever 42.

Now the periphery of the toe end portion CB of the cam 41 is so shaped and so cooperates with an end portion R of the lever 46, that there is no opening of the throttle possible until the point B is reached in this clutch engaging operation of the mechanism; and when the point B is opposite the end portion R then the clutch plates are preferably just slightly separated from each other. As the clutch plates move into engagement with each other there is of course a continued clockwise rotation of the stop member 42 and the cam 41 of said member is preferably shaped, from the point B to a point A thereon to make possible a progressive opening of the throttle 10 by the operation of the then expanded accelerator operated spring 20. When the clutch plates are fully engaged then the levers 42 and 46 and the piston 36 are in the positions disclosed in Figure 1; and it will be noted from inspection of Figure 1 that the lever 46 is then clear of the cam 41 making possible an uninterrupted throttle opening operation of the throttle operating linkage.

There is thus provided, in the members 42 and 46, a stop mechanism serving to control the mode of opening of the throttle as the motor 32 is effecting its clutch engaging operation; for the face of the member 41 may be shaped to obtain the desired degree of throttle opening at any point of the stroke of the piston 36 as the clutch is being engaged. The member 41 is preferably shaped to maintain a relatively small opening or so-called idling of the throttle as the piston moves from its clutch plate contact position to its extreme clutch disengaged position and, in the return operation, as said piston moves back from the latter position to said clutch plate contact position. As the piston continues its clutch engaging movement the throttle is progressively opened, by the operation of the spring 20, until the engine is rotating at say 1600 R. P. M. this engine speed being effected just as the engagement of the clutch is completed. Thereafter the cam 41 is clear of the lever 46 accordingly the driver may open the throttle as desired.

To facilitate the above described synchronized opening of the throttle and loading of the clutch plates it is desirable to impede the operation of the clutch springs as the clutch plate loading operation is being effected; and this is accomplished by the operation of the choke valve 62, Figure 4. As described above the solenoid 64 is energized to move the choke valve 62 upwardly, to restrict the flow of air into the compartment 54, when the piston 36 is operated to close the switch 80; and the latter operation is preferably effected during that portion of the stroke of the piston from a point when the clutch plates are just separated from each other up to and including a point just prior to a completion of a clutch engaging movement of said piston.

There is thus provided means which is operative, during a certain period of the clutch engaging movement of the piston 36, to cushion the engagement of the clutch, that is slow down the movement of the driving clutch plate 26 as it is being moved into contact with the driven clutch plate 28; and this fast, slow, fast movement of the piston provides a smooth engagement of the clutch as the throttle is being progressively opened.

Describing in greater detail one of the features of my invention during the clutch disengaging operation of the motor 32 the driver might carelessly depress the accelerator and thus open the switch 70 before said motor has completed its clutch disengaging operation; and to obviate this operation there is provided the above described switches 76 and 78 which are electrically connected in parallel with the switches 70 and 72. Now it is apparent from an inspection of Figure 1 that the first increment of clutch disengaging movement of the piston 36 will result in a closing of the switch 76 accordingly this operation completes an electrical circuit, via the then closed switch 78, to maintain the solenoid 56 energized despite an opening of the accelerator operated switch 70. When the piston is about to reach its clutch disengaged position it moves the pin 118 to open the switch 78 thereby automatically initiating a clutch engaging operation of the motor 32 assuming of course that either the accelerator has been depressed to open the switch 70 or the car is travelling above governor speed to open the switch 72. The closing of the switch 78 is, by virtue of the operation of a bleed opening 124, delayed until the clutch is again completely engaged. This bleed opening is provided in a check valve 126 and said valve is included in the switch mechanism 78 to insure the unimpeded switch opening movement of the guide 122. As described above the opening of the throttle is controlled by the cam 41 as the motor is effecting this clutch engaging operation.

There is thus provided manually and power operated means for controlling the operation of the throttle and clutch of an automotive vehicle the particular feature of my invention residing in two part stop means, including the lever 46 and the cooperating lever 42 having the cam portion 41, interconnecting the clutch operating motor and the throttle operating force transmitting means. With this mechanism an opening of the throttle is prevented once the clutch disengaging operation of said motor is initiated and the degree of opening of the throttle is controlled as said motor is operating to effect an engagement of the clutch.

Figure 2:
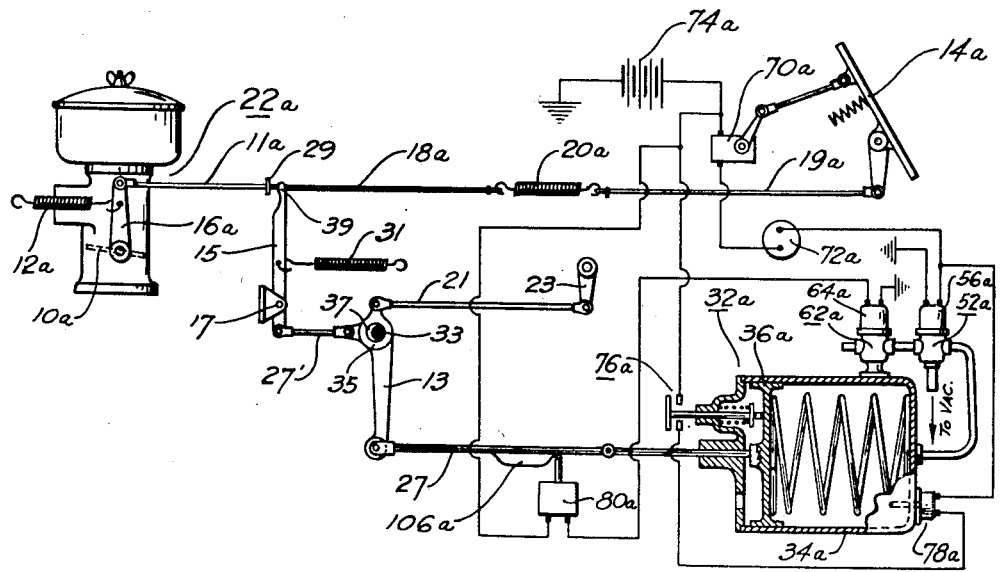
Figure 2 is a diagrammatic view disclosing the principal features of another embodiment of my invention.

There is disclosed in Figure 2 another embodiment of my invention in which the two part throttle controlling stop means includes a floating lever 13 and a lever 15 pivotally mounted upon a fixed pivot 17. The upper end of the lever 13 is pivotally connected, by a link 21, to a clutch operating crank 23; and the lower end of said lever 13 is pivotally connected to a motor piston 36a by a link 27. As to the lever 15 this element is pivotally connected to the lever 13 by means of a link 27'; and the upper end of said lever 15 is biased out of contact with a stop 29 by means of a spring 31 which is weaker than the clutch springs, not shown. The spring 31 also serves to bias the lever 13 into contact with a fixed pin 33 said pin extending through a relatively large opening 37 in an enlarged portion 35 of said lever. The remainder of the parts of the mechanism of Figure 2 duplicates the same parts in the modification of my invention disclosed in Figure 1 accordingly said parts are given the same reference numeral as the like parts in Figure 1 with the addition however of a letter a.

Describing now the operation of the mechanism disclosed in Figure 2 it will be assumed that the engine is dead and the accelerator is released; and this being true the parts assume the position disclosed in said figure that is the position with the clutches engaged the piston 36ᵃ being positioned in the left end portion of the cylinder 34ᵃ. Then when the motor 32ᵃ is energized to disengage the clutch the piston 36ᵃ moves to the right the first increment of its movement serving to rotate the lever 15 about the pivot 17 the left side of the opening 37 moving into abutment with the pin 33; and this operation serves to rotate the lever 15 counter-clockwise about its pivot 17 until an end portion 39 contacts the stop 29. Continued clutch disengaging movement of the piston results in a rotation of the crank 23 to disengage the clutch the lever 13 pivoting about the pin 33; and during this movement of the piston the lever 15 serves as a stop to prevent an opening of the throttle. If the accelerator is depressed during the latter operation all that results is an elongation of the spring 20ᵃ. As to the means for controlling the operation of the motor 32ᵃ, including the switches 70ᵃ, 72ᵃ, 76ᵃ, and 78ᵃ and the valves 52ᵃ and 62ᵃ, said control means duplicates the control means disclosed in Figure 1 accordingly a description of the operation of said control means is not repeated here.

There is thus provided, by the mechanism disclosed in Figure 2, power means for operating the clutch said means being connected to the throttle operating means by means operative to make possible a controlled opening of the throttle as the clutch is being engaged and also operative to prevent an opening of the throttle as the clutch is being disengaged.

This application is a division of my application No. 697,877 filed September 9, 1946.

Although only two embodiments of the invention have been illustrated and described, various changes in the form and relative arrangements of the parts may be made to suit requirements.

I claim:

1. The combination with the accelerator, the friction clutch, and the engine controlling throttle of the power plant of an automotive vehicle, of a pressure differential operated motor, force transmitting means, interconnecting the accelerator and the throttle, force transmitting means interconnecting the motor and the clutch, stop means, including a part connected to the first mentioned force transmitting means and a part connected to the second mentioned force transmitting means, operative to prevent an opening of the throttle when the motor is energized to disengage the clutch and to control the opening of the throttle when the motor is being de-energized to make possible a re-engagement of the clutch, valve means for controlling the operation of said motor, and means for controlling the operation of said valve means including an accelerator operated switch operative when the accelerator is released and co-operating with other parts of the controlling means to operate the valve means to effect a clutch disengaging operation of the motor, and further including electrical means operative to insure the latter operation of the valve means despite an opening of the accelerator operated switch during the clutch disengaging operation of the motor.

2. The combination with the accelerator, the friction clutch and the throttle of the power plant of an automotive vehicle, of a pressure differential operated motor, force transmitting means interconnecting the accelerator and the throttle, force transmitting means interconnecting the motor and the clutch, stop means, including a bell crank member connected to the first mentioned force transmitting means and a lever member connected to the second mentioned force transmitting means, operative to prevent an opening of the throttle when the motor is energized to disengage the clutch and also operative to control the opening of the throttle as the motor is being de-energized to make possible a re-engagement of the clutch, valve means for controlling the operation of said motor to effect a clutch disengaging operation thereof and a stage clutch engaging operation thereof, and means for controlling the operation of said valve means including an accelerator operated switch operative when the accelerator is released and cooperating with other parts of the control means to operate the valve means to effect a clutch disengaging operation of the motor, and further including electrical means, comprising motor operated switch means, operative to insure the latter operation of the valve means despite an opening of the accelerator operated switch during the clutch disengaging operation of the motor and also operative to effect the aforementioned stage clutch engaging operation of the valve means.

3. The combination with the accelerator, the friction clutch, and the throttle of the power plant of an automotive vehicle, of a pressure differential operated motor, force transmitting means interconnecting the accelerator and the throttle, force transmitting means interconnecting the motor and the clutch, stop means, including a part connected to the first mentioned force transmitting means and a part connected to the second mentioned force transmitting means, operative to prevent an opening of the throttle when the motor is energized to disengage the clutch and operative to control the opening of the throttle when the motor is being de-energized the latter operation making possible a re-engagement of the clutch, valve means for controlling the operation of said motor, and means for controlling the operation of said valve means including an accelerator operated switch operative when the accelerator is released and cooperating with other parts of the control means to operate the valve means to effect an energization of the motor, and further including electrical means operative to insure the latter operation of the valve means despite an opening of the accelerator operated switch during the energization of the motor, said electrical means including a plurality of switches which are actuated by the power element of the motor and which are electrically connected in parallel with the accelerator operated switch.

4. The combination with the accelerator, the friction clutch, and the throttle of the power plant of an automotive vehicle, of a pressure differential operated motor, force transmitting means interconnecting the accelerator and the throttle, force transmitting means interconnecting the motor and the clutch, stop means, including a part connected to the first mentioned force transmitting means and a part connected to the second mentioned force transmitting means, operative to prevent an opening of the throttle when the motor is energized to disengage the clutch and operative to control the opening of the throttle when the motor is being de-energized to make possible a re-engagement of the clutch, valve means for controlling the operation of said motor, and means for controlling the operation of said valve means including an accelerator operated switch operative when the accelerator is released and cooperating with other parts of the controlling means to operate the valve means to effect a clutch disengaging operation of the motor, and further including electrical means operative to insure the latter operation of the valve means despite an opening of the accelerator operated switch during the latter operation of the motor, said electrical means including a plurality of switches which are actuated by the power element of the motor and switch are electrically connected in parallel with the accelerator operated switch, one of said switches consisting of a breaker switch normally biased to a closed position by a spring and so connected to the power element of the motor that the switch is opened when said power element is in its motor de-energized position.

5. The combination with the accelerator, the friction clutch and the throttle of the power plant of an automotive vehicle, of a pressure differential operated motor, force transmitting means interconnecting the accelerator and the throttle, force transmitting means interconnecting the motor and the clutch, stop means, including a bell crank lever member connected to the first mentioned force transmitting means and a lever member connected to the second mentioned force transmitting means, operative to prevent an opening of the throttle when the motor is energized to disengage the clutch and also cooperating to control the opening of the throttle as the motor is being de-energized to make possible a re-engagement of the clutch, valve means for controlling the operation of the said motor to effect a clutch dis-engaging operation thereof and a stage clutch engaging operation thereof, and means for controlling the operation of said valve means including an accelerator operated switch operative when the accelerator is released and cooperating with other parts of the control means to operate the valve means to effect an energization of the motor, and further including electrical means, including motor operated switch means, operative to insure the latter operation of the valve means despite an opening of the accelerator operated switch during the latter operation of the motor and also operative to effect the aforementioned stage clutch engaging operation of the valve means.

6. The combination with the accelerator, the friction clutch and the throttle of the power plant of an automotive vehicle, of a pressure differential operated motor, force transmitting means, including a lever serving as a stop member and a floating lever connected thereto, interconnecting the accelerator, the motor, the throttle, and the clutch, the first mentioned lever being operative to prevent an opening of the throttle when the motor is energized to disengage the clutch, valve means for controlling the operation of said motor to effect a clutch disengaging operation thereof and a stage clutch engaging operation thereof, and means for controlling the operation of said valve means including an accelerator operated switch cooperating with other parts of the control means to operate the valve means to effect an energization of the motor, and further including electrical means, comprising motor operated switch means, operative to insure the latter operation of the valve means despite an opening of the accelerator operated switch during the latter operation of the motor and also operative to effect the aforementioned stage clutch engaging operation of the valve means.

7. The combination with the accelerator, the friction clutch and the throttle of the power plant of an automotive vehicle, of the pressure differential operated motor, force transmitting means, including a lever serving as a stop member and another lever connected thereto, interconnecting the accelerator, the motor, the throttle, and the clutch, the first mentioned lever being operative to prevent an opening of the throttle when the motor is energized to disengage the clutch and also operative to control the opening of the throttle as the motor is being de-energized to make possible a re-engagement of the clutch, valve means for controlling the operation of the motor to effect a clutch disengaging operation thereof and a stage clutch engaging operation thereof, and means for controlling the operation of said valve means including an accelerator operated switch cooperating with other parts of the control means to operate the valve means to effect an energization of the motor, and further including electrical means, including motor operated switch means, operative to insure the latter operation of the valve means despite an opening of the accelerator operated switch during the latter operation of the motor and also operative to effect the aforementioned stage clutch engaging operation of the valve means, one of said switches consisting of a breaker switch normally biased to a closed position by a spring and so connected to the power element of the motor that the switch is opened when said power element is in its motor de-energized position.

EARL R. PRICE.

REFERENCES CITED

The following references are of record in the file of this patent:

UNITED STATES PATENTS

| Number | Name | Date |
|---|---|---|
| 1,818,910 | Sanine | Aug. 11, 1931 |
| 1,893,644 | Fleischel | Jan. 10, 1933 |
| 1,911,599 | Bloxsom | May 30, 1933 |
| 2,348,435 | Hey | May 9, 1944 |
| 2,514,002 | Long | July 4, 1950 |